(12) United States Patent
Gabriel et al.

(10) Patent No.: US 9,152,630 B1
(45) Date of Patent: Oct. 6, 2015

(54) MODIFIED DATABASE TRANSACTION SCOPES DURING SOFTWARE TESTING

(75) Inventors: Michael R. Gabriel, Foster City, CA (US); Daniel J. Richardson, Santa Clara, CA (US)

(73) Assignee: INTUIT INC., Mountain View, CA (US)

( * ) Notice: Subject to any disclaimer, the term of this patent is extended or adjusted under 35 U.S.C. 154(b) by 127 days.

(21) Appl. No.: 13/282,346

(22) Filed: Oct. 26, 2011

(51) Int. Cl.
G06F 7/00 (2006.01)
G06F 17/00 (2006.01)
G06F 17/30 (2006.01)

(52) U.S. Cl.
CPC .............................. G06F 17/30011 (2013.01)

(58) Field of Classification Search
CPC .......... G06F 17/30607; G06F 17/3041; G06F 17/30424; G06F 17/30471; G06F 17/3048; G06F 17/30893; G06F 17/30011; G06F 17/30306
USPC ........... 707/1/1, 100, 748, 790, 648; 702/182; 713/187; 719/328; 705/8; 717/103; 715/236
See application file for complete search history.

(56) References Cited

U.S. PATENT DOCUMENTS

| | | | |
|---|---|---|---|
| 5,778,390 A * | 7/1998 | Nelson et al. | 1/1 |
| 6,138,112 A * | 10/2000 | Slutz | 707/748 |
| 6,539,386 B1 * | 3/2003 | Athavale et al. | 1/1 |
| 6,618,851 B1 * | 9/2003 | Zundel et al. | 717/103 |
| 7,191,452 B2 * | 3/2007 | Noden | 719/328 |
| 7,809,525 B2 * | 10/2010 | Chagoly et al. | 702/182 |
| 8,055,907 B2 * | 11/2011 | Deem et al. | 713/187 |
| 8,307,003 B1 * | 11/2012 | Sheth et al. | 707/790 |
| 2003/0212660 A1 * | 11/2003 | Kerwin | 707/1 |
| 2004/0044699 A1 * | 3/2004 | He | 707/201 |
| 2005/0065948 A1 * | 3/2005 | Slutz | 707/100 |
| 2006/0168334 A1 * | 7/2006 | Potti et al. | 709/239 |
| 2008/0256517 A1 * | 10/2008 | Atkin et al. | 717/124 |
| 2009/0119146 A1 * | 5/2009 | Giacomello | 705/8 |

\* cited by examiner

*Primary Examiner* — Susan Chen
(74) *Attorney, Agent, or Firm* — Park, Vaughan, Fleming & Dowler LLP; Steven E. Stupp

(57) ABSTRACT

While testing a software application that is associated with a database during a testing technique, a computer system may take over transaction scopes of transactions with the database so that data generated by the software application during the testing and communicated to the database is not persisted in the database (even though this data may be persisted in the database during normal operation). Furthermore, after the testing is completed, the computer system may restore the database to an initial state prior to the testing by rolling back the data which was not persisted.

9 Claims, 3 Drawing Sheets

MODIFIED DATABASE TRANSACTION SCOPES DURING SOFTWARE TESTING

BACKGROUND

The present disclosure relates to techniques for testing a software application associated with a database. More specifically, the present disclosure relates to a technique for testing a software application associated with a database without committing data into the database by modifying transaction scopes of transactions with the database.

Many software applications store and retrieve data from associated databases. In order to ensure proper operation when changes to a software application are deployed, it is often necessary to test the software application in conjunction with its associated database. For example, when testing a payroll software application, the associated database may be set up with the data that is needed during the testing, such as the current employees of a company. Then, the test may be performed by running payroll for the company. Moreover, the resulting data in the database may be validated to confirm that it matches what is expected based on business logic associated with the payroll software application. Next, regardless of whether the test succeeded or failed, the data in the database may be cleaned up so that the database can be reused in additional testing.

However, it can be difficult to restore the database to its initial state prior to the testing because the testing may leave the database in a 'bad' state. In particular, after the testing is completed, the data in the database may be very different than the initial state of the database. Correcting all of the changes to the database that occurred during the testing can be time-consuming and expensive.

For example, restarting the database after each test can significantly increase the time needed for testing and, thus, is usually very expensive. Alternatively, the database may be restored by 'undoing' the data that was committed or stored in the database during the testing. However, it can be very difficult to correctly undo changes. This is especially the case when a failure occurred during the testing, which can leave the database in an unknown state, and thus can result in additional test failures that necessitate future cleanup operations.

SUMMARY

The disclosed embodiments relate to a computer system that tests a software application associated with a database. During operation, the computer system executes a test script for testing the software application, where the test script checks a set of test conditions. Then, while the test script executes, the computer system takes over transaction scopes of transactions with the database so that data generated by the software application during the testing and communicated to the database is not persisted in the database. Note that, during operation of the database other than during the execution of the test script (e.g., during normal operation), the data may be persisted in the database. Moreover, on completion of the test script, the computer system restores the database to an initial state prior to the execution of the test script by rolling back the data which was not persisted.

Note that the transaction scopes may be associated with atomic operations performed by the database.

Moreover, taking over of the transaction scopes may be implemented in the database. For example, taking over of the transaction scopes may be implemented in control logic associated with the database.

Alternatively or additionally, taking over of the transaction scopes may be implemented externally to the database. For example, taking over of the transaction scopes may be implemented using an application-programming-interface associated with the database.

In some embodiments, prior to executing the test script, the computer system determines the set of test conditions. Additionally, prior to restoring the database, the computer system may validate the data.

Furthermore, the database may be restored even if the software application fails the test script. In some embodiments, the database is restored without restarting the database.

Another embodiment provides a method that includes at least some of the operations performed by the computer system.

Another embodiment provides a computer-program product for use with the computer system. This computer-program product includes instructions for at least some of the operations performed by the computer system.

Figure 1:
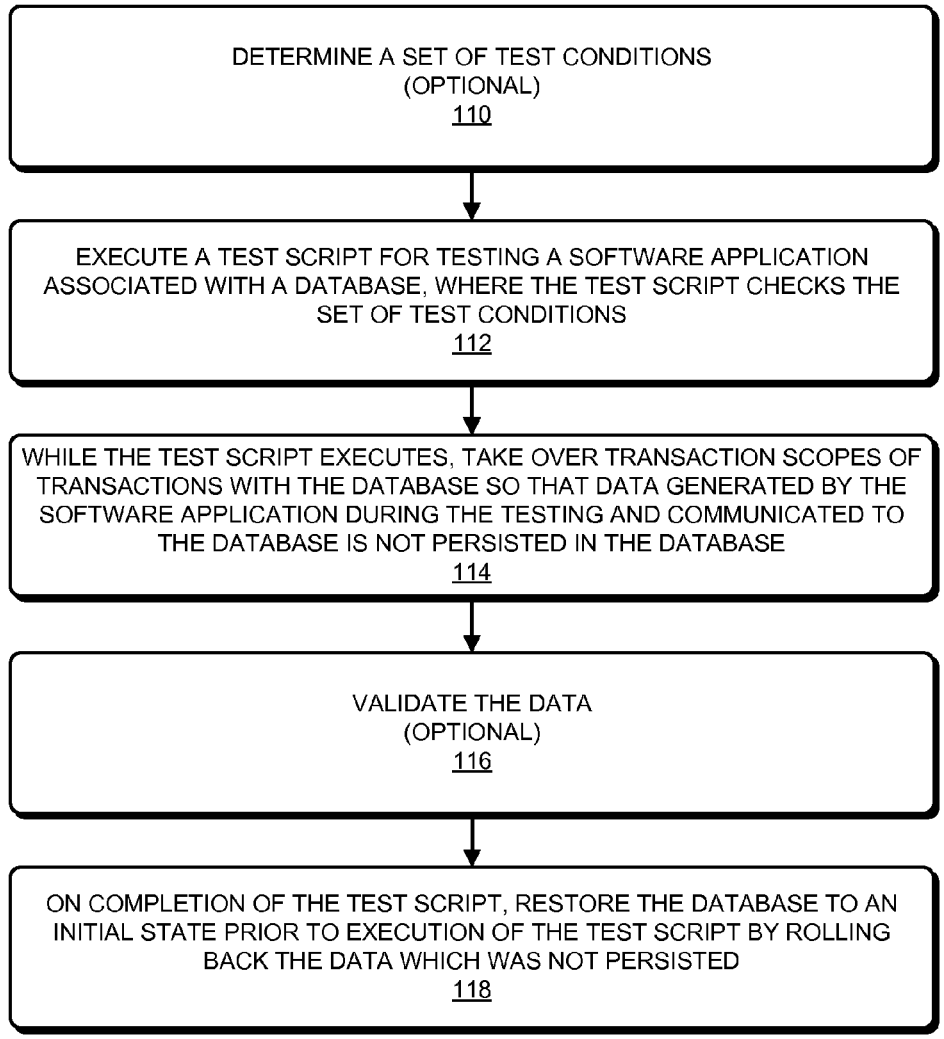
FIG. 1 is a flow chart illustrating a method for testing a software application associated with a database in accordance with an embodiment of the present disclosure.

Table 1 provides pseudo-code in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for testing a software application associated with a database, and a computer-program product (e.g., software) for use with the computer system are described. While testing the software application during the testing technique, the computer system may take over transaction scopes of transactions with the database so that data generated by the software application during the testing and communicated to the database is not persisted in the database (even though this data may be persisted in the database during normal operation). Furthermore, after the testing is completed, the computer system may restore the database to an initial state prior to the testing by rolling back the data which was not persisted.

By readily restoring the database to a known or 'good' state, this testing technique may facilitate efficient testing of software applications. In particular, the testing may be cheaper, more accurate and less time-consuming than existing testing techniques that persist or commit the data in the database during the testing. For example, the testing technique can restore the database to the initial state without restarting the database or trying to roll back persisted changes to the database. In this way, the testing technique may improve the quality of software applications, which may increase user satisfaction and, thus, sales of the software applications.

In the discussion that follows, the user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

We now describe embodiments of the testing technique. FIG. 1 presents a flow chart illustrating a method 100 for testing a software application associated with a database, which may be performed by a system (such as system 200 in FIG. 2) and/or a computer system (such as computer system 210 in FIGS. 2 and 3) in this system. During operation, the computer system executes a test script for testing the software application associated with the database (operation 112), where the test script checks a set of test conditions.

Then, while the test script executes, the computer system takes over transaction scopes of transactions with the database so that data generated by the software application during the testing and communicated to the database is not persisted in the database (operation 114). Note that, during operation of the database other than during the execution of the test script (such as during normal operation), the data may be persisted in the database. Moreover, note that the transaction scopes may be associated with atomic operations performed by the database.

On completion of the test script, the computer system restores the database to an initial state prior to the execution of the test script by rolling back the data which was not persisted (operation 118). Note that the database may be restored without restarting the database.

In some embodiments, prior to executing the test script (operation 112), the computer system optionally determines the set of test conditions (operation 110). However, in some embodiments the set of test conditions are predetermined. Additionally, prior to restoring the database (operation 118), the computer system may optionally validate the data (operation 116). However, the database may be rolled back (operation 118) whether the test script succeeded or failed.

In some embodiments, taking over of the transaction scopes is implemented in the database. For example, taking over of the transaction scopes may be implemented in control logic (i.e., hardware) associated with the database. Alternatively or additionally, taking over of the transaction scopes may be implemented externally to the database. For example, taking over of the transaction scopes may be implemented using an application-programming-interface (e.g., hardware) associated with the database. However, in general the testing technique may be implemented in hardware and/or software.

In some embodiments of method 100, there may be additional or fewer operations. Moreover, the order of the operations may be changed, and/or two or more operations may be combined into a single operation.

In an exemplary embodiment, a software application associated with a database (which includes a collection of data records, files and/or other database objects) is tested by using one or more 'commitless' transactions, in which data that is normally persisted or stored in the database (for example, on one or more hard-disk drives) is not persisted. These commitless transactions allow a test script to execute against the database and validate the resulting data, and then clean up the data without further intervention or coding from a test engineer (and, more generally, a user of the testing technique). Furthermore, after execution of the test script, the database may be ready for use in further testing without the cost of a full restart of the database. Thus, the commitless transactions may enable a controlled roll back of the data after execution of a test script (even if the software application failed the test) while leaving the tested code in the software application unchanged.

In general, data associated with transactions tends to be persisted in a database. By taking over the transaction scopes of the transactions, the data may not be persisted. Note that atomic operations, such as begin, end, commit, roll back, and other persistence operations, define the transaction scope of a given database transaction. In the testing technique, the commitless transactions can be implemented by rerouting requests associated with the transactions. For example, using the database application programming interface, during the testing technique the data may be stored in metadata fields in a database transaction log. This approach may allow the test code to execute, validate the data (including returning data from the database in response to queries) and then roll it back, without committing the data in the database (such as storing it on one or more hard-disk drives).

In an exemplary embodiment, the java.sql.connection interface is used as a so-called 'commitless connection.' In particular, this java.sql.connection interface may be used to manage a database transaction, such as commit and roll back. Moreover, the commitless connection may define or wrap a second connection, which is used to communicate with the database. Note that most messages to the commitless connection will pass through to the second connection. However, commit and roll back messages may be ignored and destroyed. When the commitless connection is released, the second connection may be asked to roll back and close. This operation may clean up any data submitted to the database during the lifetime of the commitless connection.

During the testing technique, commitless transactions may be included in the runtime execution of test scripts. This may be implemented using a variety of frameworks, such as JMock (a library that supports test-driven development of Java™ code), Guice (an open-source framework for the Java™ platform) or Spring (a platform to build and run Java™ applications). Note that Java™ is a trademark of Oracle Corporation (of Redwood Shores, Calif.).

For example, using JMock a test framework may be configured to use a mock driver manager. The driver manager may control the creation of connections. Then, the real connection to the database may be wrapped with a commitless connection. The test script may subsequently exercise the code in the software application, but the database messages may run through the commitless connection. Moreover, when the connection is released, the database may be restored to the same state it was in prior to running the test script.

Table 1 provides pseudo-code for a CommitConnection that implements the testing technique for a payroll software application.

TABLE 1

```
public class CommitlessConnection implements Connection {
    // This is the 'real' connection object.
    private Connection conn;
    // Contructor, used by the test script.
    public CommitlessConnection(Connection conn) throws SQLException {
        this.conn = conn;
        // turn off auto commit
        conn.setAutoCommit(false);
```

TABLE 1-continued

```
    }
    // This code is called by the test script once the test script is complete and the data is no longer
    required.
    public void releaseConnection( ) throws SQLException {
        // roll it back
        conn.roll back( );
        conn.close( );
    }
    @Override
    public void setAutoCommit(boolean autoCommit) throws SQLException {
        // ignore because it is already set to false;
    }
    @Override
    public boolean getAutoCommit( ) throws SQLException {
        return false;
    }
    @Override
    public void commit( ) throws SQLException {
        // do nothing
    }
    @Override
    public void roll back( ) throws SQLException {
        // do nothing
    }
    @Override
    public void close( ) throws SQLException {
        // ignore because there is no close.
    }
    @Override
    public Statement createStatement( ) throws SQLException {
        // pass through...
        return conn.createStatement( );
    }
    //there may be other passed through messages those shown above.
}
//JMockit is used to initialize the commitless transaction. It overrides the MockDbUtil class, which //functions
as a simple factory class.
@MockClass(realClass=DbUtil.class)
public class MockDBUtil {
    private static CommitlessConnection connection;
    @Mock
    public static Connection createConnection( )
    {
        if (connection == null) {
            // Initialize the DB connection properties
            // Load the jdbc-odbc bridge driver
            Class.forName (driver).newInstance( );
            // Set a timeout for login and query
            DriverManager.setLoginTimeout(75);
            // Attempt to connect to a driver. Each one of the registered drivers
            // will be loaded until one is found that can process this URL
            Connection con = DriverManager.getConnection (url, user, password);
            // Select a database
            con.setCatalog (catalog);
            connection = new CommitlessConnection(con);
        }
        return connection;
    }
    // When the data is thrown away is controlled from the test script.
    public static void cleanupConnection( ) throws SQLException {
        if (connection !=null) {
            connection.releaseConnection( );
            connection = null;
        }
    }
}
public class Paycheck {
    // add a paycheck
    public void addPaycheck(PaycheckData data) {
        Connection connection = MockDbUtil.createConnection( );
        preparePaycheckForinsertion(data);
        boolean success = insertData(data, connection);
        if (success) {
            connection.commit( );
        } else {
            connection.roll back( );
        }
        connection.close( );
    }
}
```

TABLE 1-continued

```
//Test script. Setup the MockDBUtil so that any call to DBUtil in the tested script goes through
// this object.
@UsingMocksAndStubs( {MockDBUtil.class } )
public class PaycheckTest {
   // After any test is run, cleanup the connection.
   @After
   public void cleanUpConnection( ) throws Exception {
      MockDBUtil.cleanupConnection( );
   }
   @Test
   public void testAddPaycheck( ) {
      Paycheck paycheck = Paycheck.init( );
      PaycheckData data = samplePaycheckData( );
      paycheck.addPaycheck(data);
   // verify the data is in the database.
   Connection connection = DbUtil.createConnection( );
   ResultSet rs = getPaycheckData(connection);
   verifyPaycheckResultSet(rs);
   connection.close( );
   } //the data is cleaned up at the end of this call.
}
```

Figure 2:
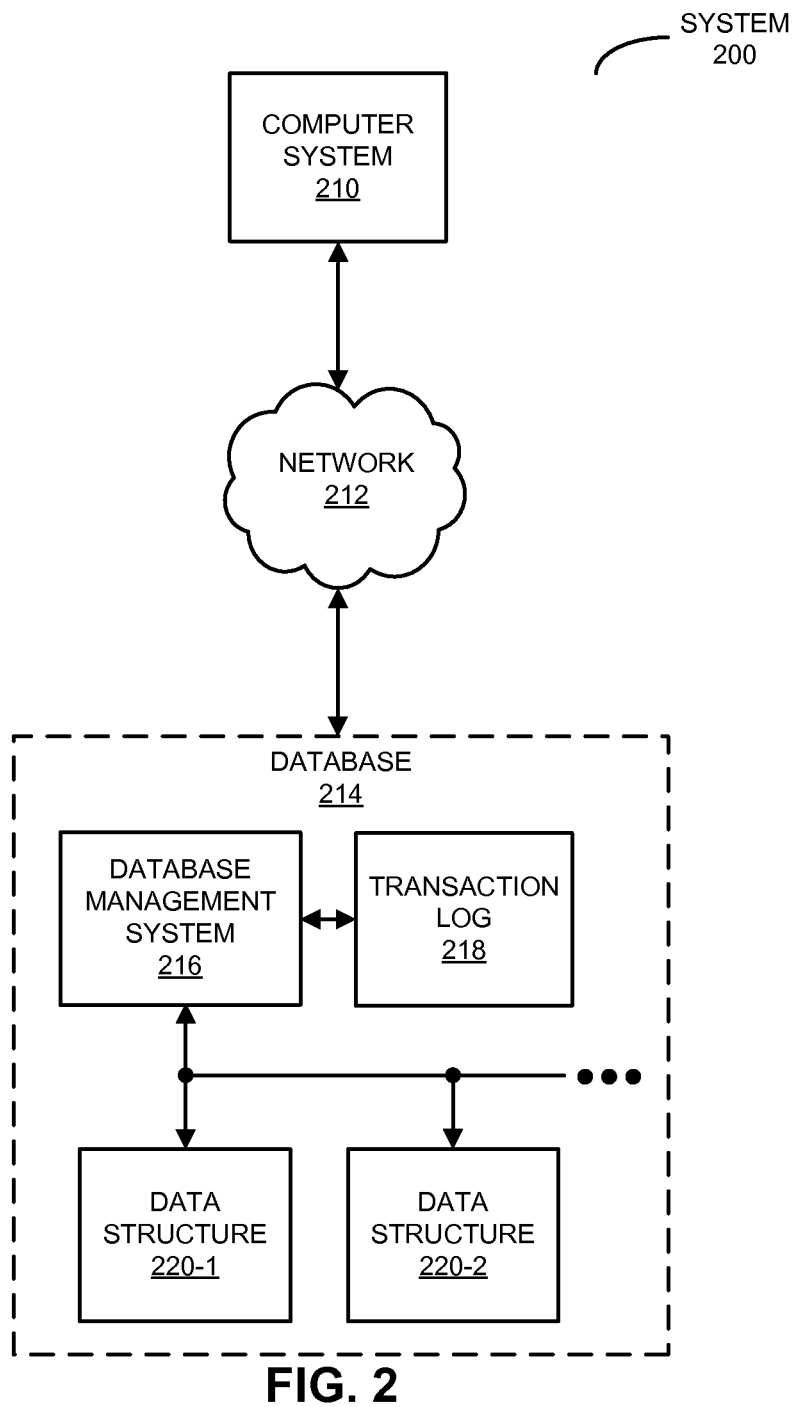
FIG. 2 is a block diagram illustrating a system that performs the method of FIG. 1 in accordance with an embodiment of the present disclosure.

We now describe embodiments of the system and the computer system, and their use. FIG. 2 presents a block diagram illustrating a system 200 that performs method 100 (FIG. 1). In this system, computer system 210 may perform testing of a software application that is associated with database 214. In particular, as discussed previously, computer system 210 may execute a test script for testing the software application, including communicating instructions, queries and responses with database 214 via network 212. Note that the test script and the software application may be resident on computer system 210 or may be stored remotely in system 200.

While the test script executes, computer system 210 may take over transaction scopes of transactions with database 214 so that data generated by the software application during the testing and communicated to database 214 is not persisted in database 214. For example, the test script may use a database application interface to instruct a software database management system 216 to reroute data associated with transactions during execution of the test script to transaction log 218 instead of storing or persisting the data in one of data structures 220 (which may be stored on one or more hard-disk drives). Furthermore, on completion of the test script, computer system 210 may instruct database management system 216, via network 212, to restore database 214 to an initial state prior to the execution of the test script by rolling back the data which was not persisted. This roll back may be performed without restarting database 214; for example, the data in transaction log 218 may be erased.

Figure 3:
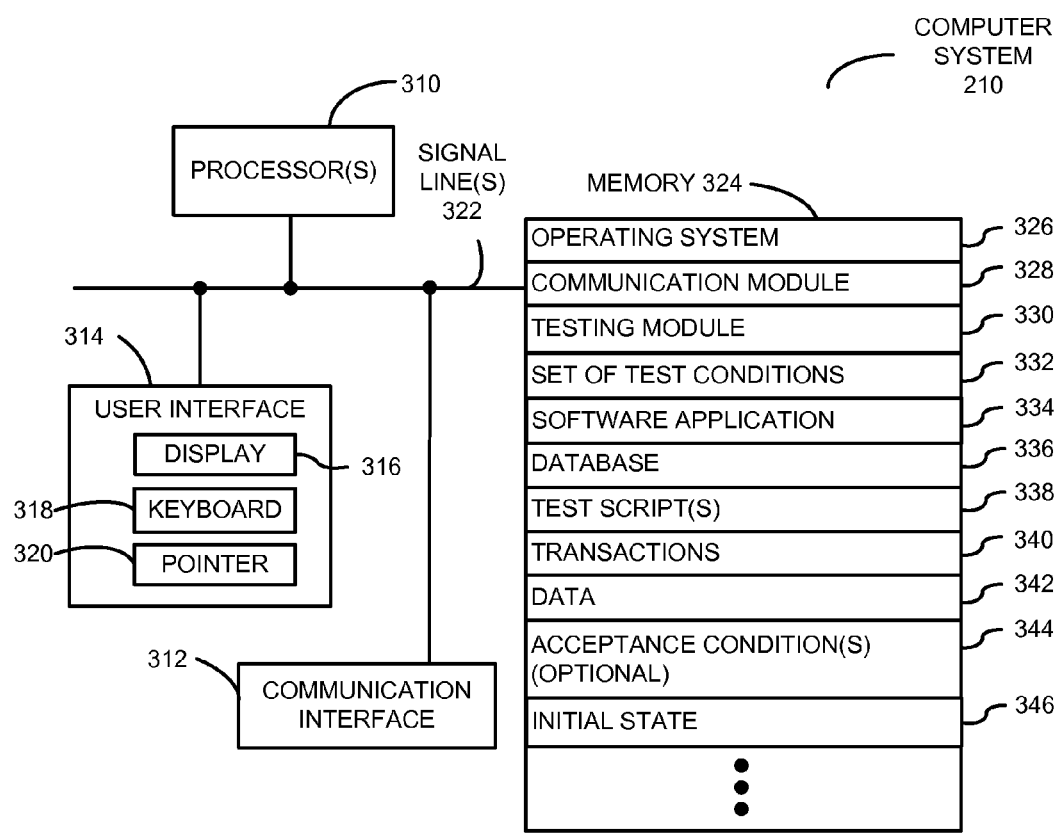
FIG. 3 is a block diagram illustrating a computer system that performs the method of FIG. 1 in accordance with an embodiment of the present disclosure.

FIG. 3 presents a block diagram illustrating computer system 210 that performs method 100 (FIG. 1). Computer system 210 includes one or more processing units or processors 310, a communication interface 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in computer system 210 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to computer system 210.

Memory 324 may also include multiple program modules (or sets of instructions), including testing module 330 (or a set of instructions). Note that one or more of these program modules (or sets of instructions) may constitute a computer-program mechanism.

During method 100 (FIG. 1), testing module 330 may optionally determine set of test conditions 332. Alternatively, set of test conditions 332 may be predetermined. Then, testing module 330 may perform testing of a software application 334 that is associated with a database 336 by executing one or more test scripts 338 based on set of test conditions 332.

While the one or more test scripts 338 execute, testing module 330 may take over transaction scopes of transactions 340 with database 336 so that data 342 generated by software application 334 during the testing and communicated to database 336 is not persisted in database 336. In some embodiments, testing module 330 may validate data 342 and may optionally determine one or more optional acceptance conditions 344 (such as pass or fail) associated with the one or more test scripts 338.

Furthermore, on completion of the one or more test scripts 338, testing module 330 may instruct database 336 to restore database 336 to an initial state 346 prior to the execution of the one or more test scripts 338 by rolling back data 342 which was not persisted. This roll back may occur without restarting database 336.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although computer system 210 is illustrated as having a number of discrete items, FIG. 3 is intended to be a functional description of the various features that may be present in computer system 210 rather than a structural schematic of the embodiments described herein. In practice, and as recognized by those of ordinary skill in the art, the functions of computer system 210 may be distributed over a large number of servers or computers, with various groups of the servers or computers performing particular subsets of the functions. In some embodiments, some or all of the functionality of computer system 210 may be implemented in one or more application-specific integrated circuits (ASICs) and/or one or more digital signal processors (DSPs).

Computer systems (such as computer system 210), as well as computers and servers in system 200 (FIG. 2) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 212 (FIG. 2) may include: the Internet, World Wide Web (WWW), an intranet, a cellular-telephone network, LAN, WAN, MAN, or a combination of networks, or other technology enabling communication between computing systems.

System 200 (FIG. 2) and/or computer system 210 (FIGS. 2 and 3) may include fewer components or additional components. Moreover, two or more components may be combined into a single component, and/or a position of one or more components may be changed. In some embodiments, the functionality of system 200 (FIG. 2) and/or computer system 210 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for testing a software application associated with a database, the method comprising:
   executing, at a computer, a test script that tests the software application by checking a set of test conditions;
   receiving, at a second connection to the database that is wrapped around a first connection to the database, a set of database messages from the software application;
   for each database message in the set of database messages:
      if, when executed, the database message would cause an operation that defines a transaction scope for a transaction for the database, providing a return code for the software application to indicate that the operation that would be caused by the database message completed successfully and ignoring the database message by not passing the database message to the database via the first connection; and
      otherwise, when executed, the database message would not cause an operation that defines a transaction scope for a transaction for the database, passing the database message to the database via the first connection; and
   upon completion of the test script, restoring the database to an initial state prior to the execution of the test script by instructing the first connection to perform a roll back operation.

2. The method of claim 1, wherein the database is restored even if the software application fails the test script.

3. The method of claim 1, wherein the database is restored without restarting the database.

4. A computer-program product for use in conjunction with a computer system, the computer-program product comprising a non-transitory computer-readable storage medium and a computer-program mechanism embedded therein, to test a software application associated with a database, the computer-program mechanism including:
   instructions for, during operation of the database:
      receiving, at a second connection to the database that is wrapped around a first connection to the database, a set of database messages from the software application;
      for each database message in the set of database messages:
         if, when executed, the database message would cause an operation that defines a transaction scope for a transaction for the database, providing a return code for the software application to indicate that the operation that would be caused by the database message completed successfully and ignoring the database message by not passing the database message to the database via the first connection; and
         otherwise, when executed, the database message would not cause an operation that defines a transaction scope for a transaction for the database, passing the database message to the database via the first connection; and
      upon completion of the test script, restoring the database to an initial state prior to the execution of the test script by instructing the first connection to perform a roll back operation.

5. The computer-program product of claim 4, wherein the database is restored even if the software application fails the test script.

6. The computer-program product of claim 4, wherein the database is restored without restarting the database.

7. A computer system, comprising:
   a processor;
   memory; and
   a program module, wherein the program module is stored in the memory and configurable to be executed by the processor to test a software application associated with a database, the program module including:
   instructions for, during operation of the database:
      receiving, at a second connection to the database that is wrapped around a first connection to the database, a set of database messages from the software application;
      for each database message in the set of database messages:
         if, when executed, the database message would cause an operation that defines a transaction scope for a transaction for the database, providing a return code for the software application to indicate that the operation that would be caused by the database message completed successfully and ignoring the database message by not passing the database message to the database via the first connection; and otherwise, when executed, the database message would not cause an operation that defines a transaction scope for a transaction for the database, passing the database message to the database via the first connection; and upon completion of the test script, restoring the database to an initial state prior to the execution of the test script by instructing the first connection to perform a roll back operation.

8. The computer system of claim 7, wherein the database is restored even if the software application fails the test script.

9. The computer system of claim 7, wherein the database is restored without restarting the database.

* * * * *